Dec. 12, 1961 M. E. ZIMMERER 3,012,422
RETAINING STRUCTURE FOR SHEAR ELEMENT
Filed July 10, 1959
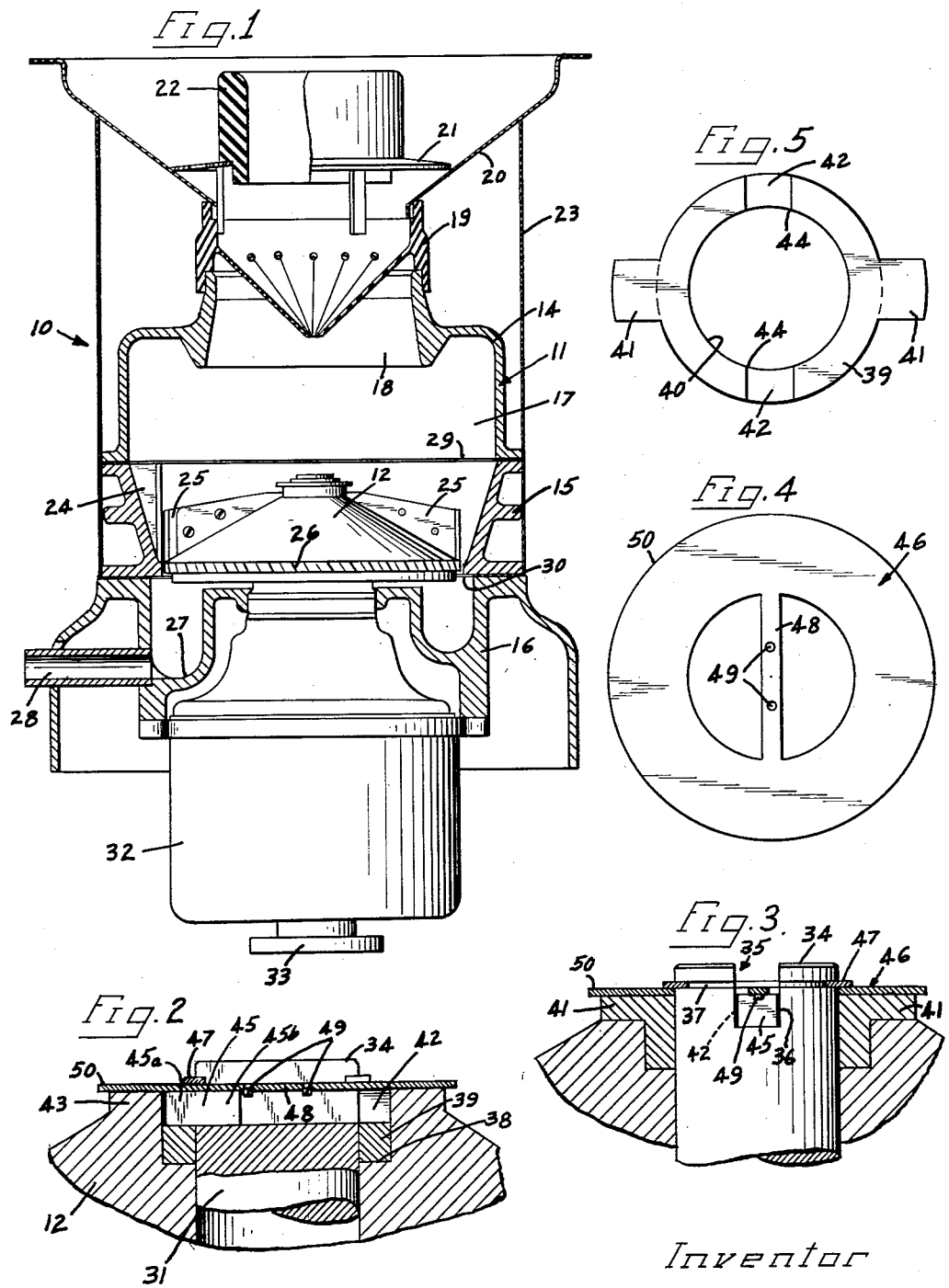
Inventor
Mark E. Zimmerer

United States Patent Office 3,012,422
Patented Dec. 12, 1961

3,012,422
RETAINING STRUCTURE FOR SHEAR ELEMENT
Mark E. Zimmerer, Kokomo, Ind., assignor, by mesne assignments, to F. M. & C. Corporation, a corporation of Delaware
Filed July 10, 1959, Ser. No. 826,276
2 Claims. (Cl. 64—28)

This invention relates generally to a retaining structure for a shear element or pin, and more specifically to an improved garbage disposal unit incorporating the novel retaining structure therein.

Although the principles of the present invention may be included in various devices, a particularly useful application is made in a garbage disposal unit of the heavy duty type.

In particular, when such units are used in commercial or industrial installations, they are frequently called upon to dispose of many articles and materials which have considerable strength. For example, while ordinary garbage is easy to comminute, in a restaurant kitchen one might expect to find other articles deliberately fed thereto, for example banana stalks, coconut shells, cellophane, tin cans and empty glass bottles. These types of waste offer no serious problem to a heavy-duty unit such as disclosed herein provided that the drainage of water therefrom is adequate. However, when a device of this type is employed in restaurants, and silverware is inadvertently discarded into it, it has been found that ordinary flatware will likewise be usually comminuted, except that the solid handles of stainless steel knives may be expected to jam and possibly damage the machine.

If conventional shear pin structure be employed, in this environment, to protect the device against such an occurrence, two further problems arise. One is that there is a danger that the shear pin or part thereof may be thrown out by centrifugal force and be the cause of further damage to the machine. The second problem which arises is that a substantial disassembly of the machine is necessary to replace the shear pin if it be disposed at a point of greater safety to the machine.

The present invention contemplates the utilization of a novel shear pin retaining structure wherein the pin as a whole as well as its parts after it has been sheared are positively retained so that they cannot escape and cause damage, should their presence go undetected. The present invention also is directed to a novel arrangement which permits easy and quick replacement of a broken shear pin without any significant disassembly of the machine, with practically no loss in time in which it is out of service, and wherein only one easily operated hand tool need be employed.

Accordingly, it is an object of the present invention to provide a novel shear pin retaining structure.

Another object of the present invention is to provide a garbage disposal unit with a shear pin retaining structure which permits easy replacement of the shear pin.

Yet another object of the present invention is to provide a garbage disposal unit with a shear pin retaining structure wherein no part of the pin can escape and possibly damage the machine.

A still further object of the present invention is to provide a shear pin structure for a garbage disposal unit which shear pin structure may be quickly replaced by one who is unskilled employing an absolute minimum of hand tools to do the same.

Another object of the present invention is to provide a shear pin retaining structure which is adaptable to be disabled in a manner which will prevent the shearing of the pin.

A still further object of the present invention is to provide a shear pin retaining structure which will indicate at assembly if the shear pin is improperly positioned.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIGURE 1 is a cross-sectional view of a garbage disposal unit, shown partly in elevation and equipped with a shear pin retaining structure provided in accordance with the principles of the present invention;

FIGURE 2 is an enlarged cross-sectional view of a fragmentary portion of FIGURE 1;

FIGURE 3 is an enlarged fragmentary view of the same portion of FIGURE 1 but taken at right angles to FIGURE 2;

FIGURE 4 is a top view of a detailed part of the novel retaining structure; and

FIGURE 5 is a top view of a second part of the same pin retaining structure.

As shown on the drawings:

The principles of this invention are particularly useful when embodied in a garbage disposal device or assembly such as illustrated in FIGURE 1, generally indicated by the numeral 10. The device 10 includes a rugged housing 11 within which a comminuting rotor 12 is rotatably and drivably disposed. The housing 11 includes an upper housing portion 14, an intermediate housing portion 15, and a lower housing portion 16. The housing portions 14–16 jointly define a chamber 17 within which the waste material is comminuted. The upper housing portion 14 has an opening 18 at its top through which waste material and water are admitted. A splash guard 19 comprising flexible rubber is disposed above the opening 18, above which there is disposed a frusto-conical tray 20. Within the tray 20 there is a rack 21 supporting a rubber guard 22, the rack 21 being supported by the tray 20, and the tray 20 being supported by a shroud 23 secured to the housing 11.

The intermediate housing portion 15 is typically provided with three stationary knives 24 which cooperate with a pair of rotating knives 25 carried by the rotor 12. The rotor 12 has angularly disposed peripheral teeth 26 which further comminute the waste material after it leaves the knives 24, 25.

The lower housing portion 16 receives the comminuted waste material in a circular vertically sloping channel 27 which communicates with a drain pipe 28. The various housing sections 14–16 are provided with intermediate gaskets 29 and 30 to prevent leakage therethrough.

The rotor 12 is carried on a shaft 31 seen in FIGURES 2 and 3 which is rotatably driven by a motor 32. A knob or wheel 33 is disposed on the opposite end of the shaft. A force may be applied to the knob 33, as for example, to reversely rotate the rotor if it be jammed.

The shaft or shaft member 31 is provided with an upwardly directed shoulder (not shown) on which the rotor 12 rests. It is apparent that the shaft 31 extends upwardly through a lower wall of the housing portion 16 into the chamber 17 with the distal end 34 terminating therein.

As best seen in FIGURE 3, the shaft 31 is provided with a radially extending slot 35, the slot 35 in this embodiment extending completely across the diameter of the shaft. As also seen in FIGURE 3, the slot 35 is open not only at the ends, but is also open in an axial direction which, in this embodiment, is directed toward the opening 18 of the housing 11.

If viewed from above, the rotor of FIGURE 1 rotates in a clockwise direction. Therefore, one edge 36 at the end of the slot 35, as best seen in FIGURE 3, comprises a hardened knife edge. The shaft 31 also has a peripheral or circumferential groove 37 which is disposed between the axial limits of the slot 35.

The rotor 12 is provided with an upwardly directed counterbore 38 within which there is disposed a ring or ring member 39 which is freely axially removable from the counterbore 38. The detailed structure of the ring 39 is best seen in FIGURES 2, 3 and 5. The ring or ring member 39 has an axial opening 40 which receives the shaft or shaft member 31 and also has outwardly radially extending means or ears 41 received in a transverse slot on the upper surface of the rotor 12 for effecting co-rotation between the ring 39 and the rotor 12.

As best seen in FIGURE 5, the ring 39 also has a pair of radially extending slots or recesses 42 which are aligned with the shaft slot 35 at both ends thereof respectively. The recesses 42 also open in the same or axially upward direction as the slot 35. As best seen in FIGURE 2, the slot 42 is closed at its radially outer end by an annular portion 43 of the rotor or rotor member 12. A corner 44 of the ring member 39 comprises a knife edge or hardened edge which cooperates with the edge 36 of the shaft 31 as a shearing edge.

In its broadest aspects, this invention contemplates that the ring 39 may be permanently inserted or integral with the rotor 12. However, in the preferred embodiment, the ring 39 is freely axially removable by the mere grasping of the ears 41. Thus while various means may be employed to insure co-rotation between the ring 39 and the rotor 12, the instant means have the further advantage that they facilitate the manual removal of the same.

Within the shaft slot 35 and within one of the ring slots or recesses 42, there is disposed a shear pin 45 which, as seen in each of FIGURES 2 and 3 is loosely received therein. The pin is of such physical size and property as to normally transmit torque from the shaft to the ring 39 and hence to the rotor 12 to effect a driving rotation thereof or to effect a co-rotation between the rotor 12 and the shaft 31. However, the pin 45 is shearable by the knife edges 44 and 36 acting jointly under the influence of a predetermined torque. Once the pin has been sheared, the pin will comprise two parts 45a and 45b which then will permit relative rotation of the shaft with respect to the rotor 12. It can be seen that the pin 45 is axially removable manually from the slots 35, 42 the part 45a being perhaps more easily removed when the ring 39 has been removed.

To hold the sheared pin parts 45a and 45b in position, as well as to hold the unsheared pin 45 in position, there is provided a washer-like member or washer 46 and a snap ring 47, which also jointly hold the rotor 12 on the shaft 31. In FIGURE 4, there is shown a top view of the washer 46 which includes a diametral leg 48 which has a pair of axially directed portions 49. As shown in FIGURES 2 and 3, the washer 46 is freely received on the end of the shaft 31 and is of such diameter or configuration that its outer peripheral portion 50 overhangs the adjacent portion of the rotor and ring. As best seen in FIGURE 2, each of the snap ring 47 and the washer 46 has a portion which overlies each part of the shear pin 45 for axially retaining the pin parts in the slot 35 and recess 42 after the pin has been sheared into parts 45a and 45b. Since the washer 46 is freely slidable on the shaft 31, and since the snap ring 47 is present, the washer 46 is removably retained adjacent to the ring 39.

It will be noted that the diametral leg 48 is disposed in the slot for engagement with the shear pin 45 in a direction which is axial with respect to the shaft 31. A cylindrical surface of the counterbore 38 closes the radially outer end of the recess 42 in the ring 39 whereby the pin 45 is retained against outward radial movement. One of the axially directed portions 49 serves to limit radial inward pin movement as shown in FIGURE 2.

Preferably the pin 45 is loosely received also in a radial direction intermediate the axially directed portion 49 and the cylindrical surface of the counterbore 38 within the annular shoulder 43. The axially directed portion 49 in this embodiment comprises a semi-perforation directed toward the bottom of the slot 35 and having such axial length that if the pin 45 were not in proper position, that is were disposed inermediate the end of the axially directed portion 49 and the bottom of the slot 35, the washer 46 would thereby be axially raised to such an extent that the snap ring 47 could not be received in the annular groove 37 in the shaft 31. Thus the presence of the pin intermediate the portion or dimple 49 and the bottom of the slot prevents reassembly until the pin has been properly repositioned. It is thus seen that means are provided which preclude the axial removal of the shear pin from the slot and which also preclude removal of the rotor from the shaft 31.

One of the principal purposes for providing two slots 42 in the ring is that in the event that one set of cutting or knife edges 44, 36 becomes worn, the opposite set may be employed. Of course, two edges 36 are also provided.

In certain types of usage, there is virtually no chance whatever that some rotor-jamming article will be thrown into the disposal device. Under such circumstance, it may be desirable to disable the shear pin feature. This can be accomplished by the insertion of a second pin 45 into the opposite recess 42 and the slot 35, and it can also be accomplished by replacing the pin 45 shown with one having greater hardness so as not to be shearable. Also, a single longer pin 45 may extend from the one recess 42 to the opposite recess 42, in which event the washer 46 would be inverted. This latter possibility is suggested only where it is desired to disable the shear pin feature.

When the device has been assembled as shown in the drawings, it will be apparent that the motor 32 will drive the rotor 12 for comminution of waste. It is also apparent that if an object which cannot be cut should lodge between the knife blades 24, 25, the rotor would jam and the moment of inertia of the motor armature would cause the shaft 31 to continue to be driven, thereby shearing the pin 45.

To replace the pin 45, the motor would first be shut off and the snap ring removed. The snap ring 47 is a conventional split ring having a pair of small holes at the free end for receiving a conventional snap ring spreading pliers. Thus to remove the snap ring 47, the rubber guard 22 and the rack 21 would first be lifted out of the tray 20. The snap ring pliers would then be inserted through the splash guard 19 for engagement with the snap ring 47. Once this part has been removed, the overhanging portions of the washer 46 would be grasped so that the washer could thereby be raised. Next the two shear pin parts 45a, 45b would be axially removed, either with or the configuration shown and described, and since they without removal of the ring 39. Since these parts have have loose fits, they may readily be removed by hand without the use of any tool whatever.

To reassemble the same, the shaft slot 35 is first aligned with the recesses 42 in the ring by effecting relative rotation between the rotor 12 and the shaft 31. Since the shaft 31 turns freely on the bearings of the motor 32, the shaft 31 must be held stationary, for example by applying a holding force to the knob or wheel 33, while the rotor 12 is turned into alignment.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A drive mechanism comprising, in combination: a rotatable motor-driven shaft having a radially extending slot disposed at one end of said shaft, and opening in both an axial direction and also in a radially outward direction; a rotor supported by said shaft; a shear ring freely axially removably received in said rotor, said shear ring and said rotor having cooperating means for effecting co-rotation therebetween, said shear ring having an axial opening receiving said shaft, and also having a radially extending recess aligned with said shaft slot and also opening in said axial direction; a shear pin loosely receivable in both said slot and said recess and normally operative to transmit torque from said shaft to said ring for effecting co-rotation of said shaft and said rotor, said shear pin being shearable jointly by said shaft and said ring into two parts in response to a predetermined amount of torque to permit relative rotation between said shaft and said rotor, said shear pin freely removable in an axial direction from said shaft; and a washer removably retained on said shaft axially adjacent to said rotor and said ring, said washer having a diametral leg received in said slot and engageable with said shear pin to prevent removal therof in an axial direction, said leg having a portion directed axially toward the bottom of the shaft slot for limiting radially inward movement of said shear pin.

2. A drive-mechanism comprising, in combination: a rotatable motor-driven shaft having a radially extending slot disposed at one end of said shaft, and opening in both an axial direction and also in a radially outward direction; said shaft having a peripheral groove disposed intermediate the axial limits of said slot; a rotor received on said shaft with the distal end of said shaft, including said groove and a portion of said shaft slot, being extended axially outwardly beyond said rotor; a shear ring freely axially removably received in said rotor, said shear ring and said rotor having cooperating means for effecting co-rotation therebetween, said shear ring having an axial opening receiving said shaft, and also having a radially extending recess aligned with said shaft slot and also opening in said axial direction; a shear pin loosely receivable in both said slot and said recess and normally operative to transmit torque from said shaft to said ring for effecting co-rotation of said shaft and said rotor, said shear pin being shearable jointly by said shaft and said ring into two parts in response to a predetermined amount of torque to permit relative rotation between said shaft and said rotor, said shear pin being freely removable in an axial direction from said shaft, a washer slidably received on said shaft axially adjacent to said rotor and said ring, said washer having a diametral leg received in said slot and engageable with said shear pin to prevent removal thereof in an axial direction, said leg having a portion directed axially toward the bottom of the shaft slot for limiting radially inward movement of said shear pin; and a snap ring received in said groove; said axially directed portion of said leg having such axial length as to preclude said snap ring from being received in said groove when said shear pin is disposed intermediate said axially directed portion and the bottom of the shaft slot.

References Cited in the file of this patent
UNITED STATES PATENTS

| | | |
|---|---|---|
| 1,758,180 | Stein | May 13, 1930 |
| 1,805,879 | McKenny | May 19, 1931 |
| 2,050,630 | Reid | Aug. 11, 1936 |
| 2,585,113 | Gredell | Feb. 12, 1952 |
| 2,857,109 | Haeussler | Oct. 21, 1958 |
| 2,902,228 | Higer | Sept. 1, 1959 |